United States Patent Office 3,641,207
Patented Feb. 8, 1972

3,641,207
THERMOPLASTIC RESIN BLEND OF POLY-
SULFONE RESIN AND AN ETHYLENE-
PROPYLENE TERPOLYMER OR GRAFT
DERIVATIVE THEREOF
Robert L. Lauchlan, Granger, Ind., assignor to
Uniroyal, Inc., New York, N.Y.
No Drawing. Filed July 15, 1969, Ser. No. 842,009
Int. Cl. C08f 29/12, 41/12
U.S. Cl. 260—876 R                    10 Claims

ABSTRACT OF THE DISCLOSURE

Blends of thermoplastic polysulfone resin and ethylene-propylene terpolymers and graft derivatives thereof are characterized by an unusually useful combination of properties, particularly low temperature melt processability in combination with high impact strength and flexural strength.

FIELD OF THE INVENTION

This invention relates to blends of synthetic polymer compositions. More particularly, the invention relates to the blend which results from the physical admixing of a polysulfone resin with an ethylene propylene terpolymer or graft derivatives from said terpolymer.

SUMMARY OF THE INVENTION

There is a need for reasonably priced plastic compounds possessing the following properties: toughness, good mechanical strength, resistance to high temperatures, good melt processability and high impact strength over a wide range of temperatures. The present invention provides such a plastic compound, in the form of a blend of from 99% to 75% (all percentages are expressed by weight herein) of a thermoplastic polysulfone and correspondingly from 1% to 25% of a terpolymer or graft derivative thereof. The resulting blends exhibit thermoplastic properties including good melt processability and impact resistance without sacrificing the desirable heat distortion temperature and flexural strength of the unmodified polysulfone resin.

DESCRIPTION OF PREFERRED EMBODIMENTS

The matrix or predominate portion of the polyblend of the invention may be described as a linear, thermoplastic polyarylene polyether polysulfone, wherein the arylene units are interspersed with ether and sulfone linkages. These resins may be obtained by reaction of an alkali metal double salt of a dihydric phenol and a dihalobenzenoid compound, either or both of which contain a sulfone linkage —SO$_2$— between arylene groupings, to provide sulfone units in the polymer chain in addition to arylene units and ether units. The polysulfone polymer has a basic structure composed of recurring units of the formula

—O—E—O—E'— wherein E is the residuum of the dihydric phenol and E' is the residuum of the benzenoid compound having an inert electron withdrawing group in at least one of the positions ortho and para to the valence bonds; both of said residua are valently bonded to the ether oxygens through aromatic carbon atoms; at least one of said residua (E or E' or both) provides a sulfone linkage between aromatic carbon atoms. Such polysulfones are included within the class of polyarylene polyether resins described in U.S. Pat. 3,264,536, referred to above, the disclosure of which is hereby incorporated herein by reference for the purpose of describing and exemplifying E and E' in more detail, including the preferred forms of E derived from dinuclear phenols having the structure:

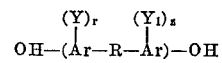

as defined therein, with the further limitation that either E or E' must be so selected, from the values of E and E' disclosed in said patent, as to contain a sulfone linkage to provide sulfone units in the final polymer chain. Thus, if E is so selected as not to contain the sulfone linkage, then E' must be selected from one of the forms containing sulfone linkage; if E' is so selected as not to contain a sulfone linkage, then E must be selected from one of the forms containing a sulfone linkage. Of course, E and E' may both contain sulfone linkages if desired. Typical preferred polymers are composed of recurring units having the formula

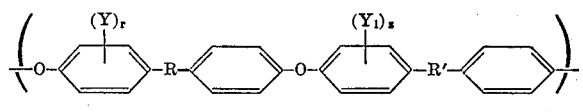

as described in the Robinson et al. patent, with the further proviso that at least one of R and R' must be —SO$_2$—. In the foregoing formula Y and Y$_1$ can be the same or different inert substituent groups as alkyl groups having from 1 to 4 carbon atoms, halogen atoms (i.e., fluorine, chlorine, bromine or iodine) or alkoxy radicals having from 1 to 4 carbon atoms, r and z are integers having a value of from 0 to 4, inclusive. Typically R is representative of a bond between aromatic carbon atoms or a divalent connecting radical and R' represents sulfone. Preferably R represents a bond between aromatic carbon atoms. Even more preferred are the thermoplastic polyarylene polysulfones of the above formula wherein r and z are zero, R is a divalent connecting radical of the formula

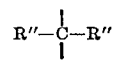

wherein R'' represents, as exemplified in Robinson et al., a member of the group consisting of alkyl, lower aryl, and the halogen substituted groups thereof, and R' is a sulfone group.

Typical examples are the reaction products prepared from 2,2-bis-(4-hydroxyphenyl) propane (source of residue) with 4,4'-dichlorodiphenylsulfone (source of E' residue) and equivalent reaction products such as those from 4,4'-dichlorodiphenylsulfone with bisphenol of benzophenone, or the bisphenol of acetophenone, or the bisphenol of vinyl cyclohexane, or 4,4'-dihydroxydiphenyl sulfone (see Examples 1, 3, 4, 5 and 7 of Robinson et al.).

Further useful discussion of the polysulfone resins which may be used is to be found in British Pat. 1,060,546, referred to above. Ordinarily at least about 10% and preferably at least about 20% of the linkages between the arylene groups are sulfone groups.

Apart from the ether and sulfone linkages, arylene groups may be bonded directly to each other or may be separated by inert groups, e.g., alkylidene groups such as isopropylidene groups, which latter appear in the chain when bisphenol A is used in the preparation of the polysulfone.

The additive terpolymers or graft polymers constitute between 1% and 25% of the blend nad preferably between 5% and 20% of the blend. The latter range is preferred because within these limits the processability of the blend is optimized. The polymers which are blended with the polysulfone resin matrix are (a) the ethylene-propylene non-conjugated diene terpolymers (EPDM) and/or (b) graft additives thereof.

The non-conjugated dienes used in the preparation of the terpolymer elastomers may include open chain non-conjugated dienes such as 1,4-hexadiene and also cyclic (especially bridged ring) non-conjugated dienes such as dicyclopentadiene, 5-methylene 2-norbornene, 5-ethylidene 2-norbornene and 1,4-cyclooctadiene. The respective weight ratio ethylene to propylene in the elastomers may range from 40/60 to 75/25. The content of additional monomers, such as the non-conjugated diene, in the terpolymer may range from about 1% to about 20% by weight.

Suitable terpolymers rubbers are described for example in British Pat. 886,368, to United States Rubber Company Dec. 31, 1965 and British Pat. 1,107,936. For optimum solubility it is preferred that the elastomer have a 212° F. Mooney viscosity of less than 75 (ML-4) although higher molecular weight elastomers may be used.

Some specific examples of suitable rubber polymers are polymers made from ethylene-propylene-dicyclopentadiene (a preferred species in the present invention), ethylene-propylene-1,4-hexadiene, ethylene-propylene-methylene norbornene, ethylene-propylene-cyclooctadiene, ethylene-propylene-tetrahydroindene and ethylene-propylene-5-ethylidene-2-norbornene.

All of the above noted elastomer polymers can be made by solution polymerization which polymerization uses a coordination catalyst prepared by mixing a vanadium compound, (e.g. $VOCl_3$) with an alkylaluminum halide (e.g. ethylaluminum sesquichloride).

The graft terpolymers used in the present invention are made by graft copolymerizing on the terpolymer spines disclosed herein one or more resin-forming monomers such as those having the general formula:

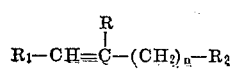

wherein R and $R_1$ each represent a substituent selected from the group consisting of hydrogen, halogen, an alkyl group having 1 to 4 carbon atoms, carboalkoxy, or R and $R_1$ compositely represent an anhydride linkage (—COOOC—)

and $R_2$ is hydrogen, vinyl, an alkyl or alkenyl, cycloalkyl, carboalkoxy, alkoxy alkyl, alkyl carboxy, aralkyl ketoxy, aryl, all of which do not contain more than 12 carbon atoms, although in the case of an alkyl group only 1 carbon need be present, halogen, carboxy, cyano, or pyridyl group and n is an integer between 0 and 9. Preferred monomers to be grafted are styrene, methyl methacrylate or combinations thereof such as styrene-acrylonitrile, etc. Other useful monomers are alpha methyl styrene, methacrylonitrile and ethyl acrylate. In the final graft copolymer the resinous portion and the rubbery portion are believed to be in large part chemically combined.

In some cases the grafted EPDM polymer is blended with additional separately prepared resins using the monomers disclosed in the graft polymerization method noted above.

The object of this invention is to modify a polysulfone resin with the terpolymer or graft derivatives from said terpolymer so that when comparing the blend with an unmodified polysulfone, the desirable heat distortion temperature and modulus of elasticity of unmodified polysulfone is substantially retained while the impact strength is increased.

The modulus of elasticity as determined by ASTM method D790–66 is a measure of the stiffness or rigidity of a material. In general thermoplastics deform permanently when heavy loads are applied, and therefore a plastic with high modulus is preferred. Modulus decreases with an increase in temperature, and above the heat distortion temperature the modulus drops sharply.

The impact strength of a plastic as determined by ASTM method D256–56 method A, is a measure of its toughness in terms of its resistance to breakage under conditions of high velocity of an impacting object. The impact strength values are of practical importance since they provide quantitative differentiation of materials in terms of their resistance to fracture. In the present invention there is a slight sacrifice of modulus but this is negligible, when compared with the increase in impact strength. Of great importance in the present invention is the capability of providing a proper balance of properties in the blend to suit individual requirements or uses.

It is obvious that the additive polymers used in accordance with the present invention possess a spectrum of moduli. Thus the properties of said additive polymers will range from rubbery to resinous, and the polysulfone properties will be modified accordingly.

To prepare the belnd of the invention, the polysulfone and the terpolymer or graft derivative thereof may be mechanically blended together in the desired proportions with the aid of any suitable mixing device conventionally used for mixing rubbers or plastics, such as a differential roll mill, Banbury or other internal mixer or an extruder. An internal shear mixer such as a Banbury mixer is preferred because of its ease of operation. In order to facilitate thorough mixing of the polymers and to develop the desired improved combination of physical properties, the mechanical blending is carried out at sufficiently high temperatures to soften the polymers so that they are thoroughly dispersed and intermingled with each other. As the polysulfone has the higher softening point, this temperature will govern the mixing temperature selected. Mixing is continued until a uniform blend is obtained.

Alternatively the polysulfone and terpolymer or graft derivative of said terpolymer may be solution blended by dissolving the polymers in a suitable solvent, and subsequently precipitating the polymer blend by adding the solution into a miscible non-solvent to produce a homogeneous blend which is then dried.

The following examples illustrate the invention in greater detail and specifically show that upon the introduction of the terpolymer or graft derivative of said terpolymer into the polysulfone, the proportionate increase in the impact strength of the polyblend is significantly greater than the proportionate decrease in modulus of said polyblend.

EXAMPLE 1

This example illustrates the impact improvement achieved by incorporating into polysulfone resin various levels of an ethylene-propylene-dicyclopentadiene terpolymer manufactured by Uniroyal, Inc. The terpolymer is characterized by an ML-4 viscosity of 60 at 212° F., an iodine number of 10 and a weight percent propylene of 32.

The terpolymer in each instance was blended into the polysulfone resin in a Banbury above the fluxing temperature of 410° F. The polyblends were subsequently milled and calendered at 430° F. and the resulting sheets laminated to form plaques (¼" x 8" x 8") in a press at 450° F. under 20 tons load.

The comparative data is set forth in Table 1.

TABLE 1.—COMPARISON OF RESIN AND POLYBLEND PROPERTIES

|  | 100% polysulfone | 95% polysulfone, 5% EPDM [1] | 90% polysulfone, 10% EPDM | 85% polysulfone, 15% EPDM |
|---|---|---|---|---|
| ¼" notched Izod (ft.-lbs./in.) | 0.8 | 14.0 | 9.6 | 2.8 |
| Percent increase in impact strength over base resin | | 1650 | 1100 | 250 |
| Flexural modulus (p.s.i.×10⁵) | 3.73 | 3.32 | 2.78 | 2.38 |
| Percent decrease in flexural modulus over base resin | | 11 | 25 | 36 |
| Heat distortion temp. (° F., 264 p.s.i.) | 341 | 332 | 338 | 327 |
| Rockwell hardness | 120 | 120 | 113 | 101 |

[1] EPDM represents ethylene-propylene-dicyclopentadiene terpolymer.

As shown in Table 1, the proportionate increase in the +73° F. notched Izod impact value is greater than the proportionate decrease in modulus for each of the polyblends listed. The heat distortion temperature of the polyblend is relatively unchanged.

EXAMPLE 2

This example illustrates the impact improvement achieved by incorporating into polysulfone resin 10% of an ethylene-propylene - 5 - ethylidene - 2 - norborene terpolymer manufactured by Uniroyal, Inc. The terpolymer is characterized by an ML-4 viscosity of 60 at 212° F., an iodine number of 10 and a weight percent propylene of 42. The terpolymer was blended into the polysulfone resin in a Banbury mixer above the fluxing temperature of 410° F. The polyblends were subsequently milled and calendered at 440° F. and the resulting sheets laminated to form plaques (¼" x 8" x 8") in a press at 450° F. under 20 tons load.

The comparative data is set forth in Table 2.

TABLE 2.—COMPARISON OF RESIN AND POLYBLEND PROPERTIES

|  | 100% polysulfone | 90% polysulfone, 10% EPDM [1] |
|---|---|---|
| ¼" notched Izod (ft.-lbs./in.) | 0.8 | 6.2 |
| Percent increase in impact strength over base resin | | 675 |
| Flexural modulus (p.s.i.×10⁵) | 3.73 | 2.95 |
| Percent decrease in flexural modulus over base resin | | 21 |
| Heat distortion temperature (° F., 264 p.s.i.) | 341 | 333 |
| Rockwell hardness | 120 | 114 |

[1] EPDM represents ethylene-propylene-5-ethylidene-2-norbornene.

As shown in Table 2, the proportionate increase in the +73° F. notched Izod impact value is greater than the proportionate decrease in modulus for the polyblend.

EXAMPLE 3

This example illustrates the impact improvement achieved by incorporating into polysulfone resin 10% of an ethylene-propylene-1,4-hexadiene terpolymer manufactured by E.I. du Pont de Nemours. The terpolymer is characterized by an ML-4 viscosity of 70 at 212° F. The terpolymer was blended into the polysulfone resin in a Banbury mixer above the fluxing temperature of 410° F. The polyblends were subsequently milled and calendered at 440° F. and the resulting sheets laminated to form plaques (¼" x 8" x 8") in a press at 450° F. under 20 tons load.

The comparative data is set forth in Table 3.

TABLE 3.—COMPARISON OF RESIN AND POLYBLEND PROPERTIES

|  | 100% polysulfone | 90% polysulfone, 10% EPDM [1] |
|---|---|---|
| ¼" notched Izod (ft.-lbs./in.) | 0.8 | 8.1 |
| Percent increase in impact strength over base resin | | 913 |
| Flexural modulus (p.s.i.×10⁵) | 3.73 | 2.98 |
| Percent decrease in flexural modulus over base resin | | 20 |
| Heat distortion temperature (° F., 264 p.s.i.) | 341 | 333 |
| Rockwell harness | 120 | 114 |

[1] EPDM represents ethylene-propylene-14-hexadiene.

As shown in Table 3, the proportionate increase in the +73° F. notched Izod impact value is greater than the proportionate decrease in modulus for the polyblend.

EXAMPLE 4

This example illustrates the impact improvement achieved by incorporating into polysulfone resin 10% of an ethylene-propylene-1,4-hexadiene terpolymer manufactured by E.I. du Pont de Nemours. The terpolymer is characterized by an ML-4 viscosity of 40 at 212° F. The terpolymer was blended into the polysulfone resin in a Banbury mixer above the fluxing temperature of 410° F. The polyblends were subsequently milled and calendered at 440° F. and the resulting sheets laminated to form plaques (¼" x 8" x 8") in a press at 450° F. under 20 tons load.

The comparative data is set forth in Table 3.

TABLE 4.—COMPARISON OF RESIN AND POLYBLEND PROPERTIES

|  | 100% polysulfone | 90% polysulfone, 10% EPDM [1] |
|---|---|---|
| ¼" notched Izod (ft.-lbs./in.) | 098 | 9.5 |
| Percent increase in impact strength over base resin | | 963 |
| Flexural modulus (p.s.i.×10⁵) | 3.73 | 2.82 |
| Percent decrease in flexural modulus over base resin | | 24 |
| Heat distortion temperature (° F., 264 p.s.i.) | 341 | 331 |
| Rockwell hardness | 120 | 113 |

[1] EPDM represents ethylene-propylene-14-hexadiene.

As shown in Table 4, the proportionate increase in the +73° F. notched Izod impact value is greater than the proportionate decrease in modulus for the polyblend.

EXAMPLE 5

This example illustrates the impact improvement achieved by incorporation into polysulfone resin 10% of an ethylene-propylene-5-ethylidene-2-norbornene terpolymer manufactured by Uniroyal Inc. The terpolymer is characterized by an ML-4 viscosity of 90 at 212° F., an iodine number of 10 and a weight percent propylene of 40. The terpolymer was blended into the polysulfone resin in a Banbury mixer above the fluxing temperature of 410° F. The polyblends were subsequently milled and calendered at 440° F. and the resulting sheets laminated to form plaques (¼" x 8" x 8") in a press at 450° F. under 20 tons load.

The comparative data is set forth in Table 5.

TABLE 5.—COMPARISON OF RESIN AND POLYBLEND PROPERTIES

|  | 100% polysulfone | 90% polysulfone, 10% EPDM [1] |
|---|---|---|
| ¼" notched Izod (ft.-lbs./in.) | 0.8 | 5.3 |
| Percent increase in impact strength over base resin |  | 563 |
| Flexural modulus (p.s.i.×10⁵) | 3.73 | 2.82 |
| Percent decrease in flexural modulus over base resin |  | 24 |
| Heat distortion temperature (° F., 264 p.s.i.) | 341 | 327 |
| Rockwell hardness | 120 | 113 |

[1] EPDM represents ethylene-propylene-5-ethylidene-2-norbornene.

As shown in Table 5 the proportionate increase in the +73° F. notched Izod impact value is greater than the proportionate decrease in modulus for the polyblend.

EXAMPLE 6

This example illustrates the degree of improvement in impact strength achieved by incorporating into polysulfone resin (coded P-1700 and sold by Union Carbide Co.) various levels of a graft copolymer consisting of 42% styrene, 18 acrylonitrile and 40% ethylene-propylene-5-ethylidene-2-norbornene terpolymer spine, said percentages being based on the total weight of graft copolymer. The terpolymer spine has a propylene content of 37%, based upon the total weight of the terpolymer and an iodine number of 9.

The graft copolymer used herein was prepared according to the method described in copending application Ser. No. 787,894, filed December 30, 1968.

The graft copolymer was blended into the polysulfone resin at 480° F. on a differential roll mill, calendered at 450° F. and subsequently molded into plaques using the method described in Example 1.

The data set forth in Table 6 is a comparison of the unmodified polysulfone resin with the polysulfone resin blended with the graft copolymer described in this example.

TABLE 6.—COMPARISON OF RESIN AND POLYBLEND PROPERTIES

|  | 100% polysulfone | 95% polysulfone, 5% S/AN on EPDM [1] | 90% polysulfone, 10% S/AN on EPDM [1] |
|---|---|---|---|
| ¼" notch Izod impact strength (ft.-lbs./in.)+73° F. | 0.8 | 4.3 | 10.7 |
| Percent increase in impact strength over base resin |  | 438 | 1,237 |
| Flexural modulus | 373,000 | 334,000 | 298,000 |
| Percent decrease in flexural modulus over base resin |  | 10.5 | 20 |
| Heat distortion temp. (° F., 264 p.s.i.) | 341 | 336 | 332 |
| Rockwell hardness |  | 122 | 116 |

[1] Represents the styrene-acrylonitrile on ethylene-propylene terpolymer spine described above.

EXAMPLE 7

This example illustrates the degree of improvement in impact strength achieved by incorporating into polysulfone resin (coded P-1700 and sold by Union Carbide Co.) various levels of a graft copolymer consisting of 35% styrene, 15% acrylonitrile and 50% ethylene-propylene-5-ethylidene-2-norbornene terpolymer spine, said percentages being based on the total weight of graft copolymer.

The terpolymer spine has a propylene content of 37%, based upon the total weight of the terpolymer and an iodine number of 9.

The graft copolymer used herein was prepared according to the method described in copending application Ser. No. 787,984, filed Dec. 30, 1968.

The graft copolymer was blended into the polysulfone resin at 480° F. on a differential roll mill, calendered at 450° F. and subsequently molded into plaques using the method described in Example 1.

The data set forth in Table 7 is a comparison of the unmodified polysulfone resin with the polysulfone resin blended with the graft copolymer described in this example.

TABLE 7.—COMPARISON OF RESIN AND POLYBLEND PROPERTIES

|  | 100% polysulfone | 95% polysulfone, 5% S/AN on EPDM [1] | 90% polysulfone, 10% S/AN on EPDM [1] |
|---|---|---|---|
| ¼" notch Izod impact strength (ft.-lbs./in.)+73° F. | 0.8 | 1.9 | 3.4 |
| Percent increase in impact strength over base resin |  | 137 | 325 |
| Flexural modulus | 373,000 | 340,000 | 292,000 |
| Percent decrease in flexural modulus over base resin |  | 8.9 | 21.7 |
| Heat distortion temp. (° F., 264 p.s.i.) | 341 | 339 | 333 |
| Rockwell hardness |  | 122 | 112 |

[1] Represents the styrene/acrylonitrile on ethylene-propylene terpolymer spine described above.

EXAMPLE 8

This example illustrates the degree of improvement in impact strength achieved by incorporating into polysulfone resin (coded P-1700 and sold by Union Carbide Co.) various levels of a graft copolymer consisting of 28% styrene, 12% acrylonitrile and 60% ethylene-propylene-5-ethylidene-2-norbornene terpolymer spine, said percentages being based on the total weight of graft copolymer.

The terpolymer spine has a propylene content of 37%, based upon the total weight of the terpolymer and an iodine number of 9.

The graft copolymer was blended into the polysulfone resin at 480° F. on a differential roll mill, calendered at 450° F. and subsequently molded into plaques using the method described in Example 1.

The data set forth in Table 8 is a comparison of the unmodified polysulfone resin with the polysulfone resin blended with the graft copolymer described in this example.

TABLE 8.—COMPARISON OF RESIN AND POLYBLEND PROPERTIES

|  | 100% polysulfone | 95% polysulfone, 5% S/AN EPDM [1] | 90% polysulfone, 10% S/AN on EPDM [1] |
|---|---|---|---|
| ¼" notch Izod impact strength (ft.-lbs./in.)+73° F. | 0.8 | 7.4 | 2.7 |
| Percent increase in impact strength over base resin |  | 825 | 238 |
| Flexural modulus | 373,000 | 334,000 | 298,000 |
| Percent decrease of flexural modulus over base resin |  | 10.5 | 20 |
| Heat distortion temp, (° F., 264 p.s.i.) | 341 | 339 | 333 |
| Rockwell hardness |  | 122 | 112 |

[1] Represents the styrene-acrylonitrile on ethylene-propylene spine described above.

EXAMPLE 9

This example illustrates the degree of improvement in impact strength achieved by incorporating into polysulfone resin (code P-1700 and sold by Union Carbide Co.) various levels of a graft copolymer consisting of 21% styrene, 9% acrylonitrile and 70% ethylene-propylene-5-ethylidene-2-norbornene terpolymer spine, said percentages being based on the total weight of graft copolymer.

The terpolymer spine has a propylene content of 37% based upon the total weight of the terpolymer and an iodine number of 9.

The graft copolymer used herein was prepared according to the method described in copending application Serial No. 787,984, filed December 30, 1968.

The graft copolymer was blended into the polysulfone resin at 480° F. on a differential roll mill, calendered at 450° F. and subsequently molded into plaques using the method described in Example 1.

The data set forth in Table 9 is a comparison of the unmodified polysulfone resin with the polysulfone resin blended with the graft copolymer described in this example.

TABLE 9.—COMPARISON OF RESIN AND POLYBLEND PROPERTIES

|  | 100% polysulfone | 95% polysulfone, 5% S/AN on EDPM [1] | 90% polysulfone, 10% S/AN on EDPM [1] |
|---|---|---|---|
| ¼″ notch Izod impact strength (ft.-lbs./in.)+73° F. | 0.8 | 13.3 | 2.7 |
| Percent increase in impact strength over base resin |  | 1562 | 237 |
| Flexural modulus | 373,000 | 297,000 | 271,000 |
| Percent decrease in flexural modulus over base resin |  | 20 | 27.4 |
| Heat distortion temp. (° F., 264 p.s.i.) | 341 | 333 | 328 |
| Rockwell hardness |  | 120 | 110 |

[1] Styrene - acrylonitrile on ethylene - propylene terpolymer spine described above.

EXAMPLE 10

This example illustrates the degree of improvement in impact strength achieved by incorporating into polysulfone resin (coded P–1700 and sold by Union Carbide Co.) various levels of a graft copolymer consisting of 50% styrene, and 50% ethylene-propylene-5-ethylidene-2-norbornene terpolymer spine, said percentages being based on the total weight of graft copolymer.

The terpolymer spine has a propylene content of 37%, based upon the total weight of the terpolymer and an iodine number of 9.

The graft copolymer used herein was prepared according to the method described in copending application Ser. No. 787,984, filed Dec. 30, 1968.

The graft copolymer was blended into the polysulfone resin at 480° F. on a differential roll mill, calendered at 450° F. and subsequently molded into plaques using the method described in Example 1.

The data set forth in Table 10 is a comparison of the unmodified polysulfone resin with the polysulfone resin blended with the graft copolymer described in this example.

TABLE 10.—COMPARISON OF RESIN AND POLYBLEND PROPERTIES

|  | 100% polysulfone | 90% polysulfone, 10% S on EPDM [1] |
|---|---|---|
| ¼″ notch Izod impact strength (ft.-lbs./in.) +73° F. | 0.8 | 9.0 |
| Percent increase in impact strength over base resin |  | 1,025 |
| Flexural modulus | 373,000 | 302,000 |
| Percent decrease in flexural modulus over base resin |  | 19 |
| Heat distortion temp. (° F., 264 p.s.i.) | 341 | 334 |
| Rockwell hardness |  | 114 |

[1] The styrene on ethylene-propylene terpolymer spine described above.

EXAMPLE 11

This example illustrates the degree of improvement in impact strength achieved by incorporating into polysulfone resin (coded P–1700 and sold by Union Carbide Co.) various levels of a graft copolymer consisting of 29.5% styrene, 29.4% methyl methacrylate and 42.1% ethylene-propylene-5-ethylidene-2-norbornene terpolymer spine, said percentages being based on the total weight of graft copolymer.

The terpolymer spine has a propylene content of 37%, based upon the total weight of the terpolymer and an iodine number of 9.

The graft copolymer used herein was prepared according to the method described in copending application Ser. No. 787,984, filed Dec. 20, 1968.

The graft copolymer was blended into the polysulfone resin at 480° F. on a differential roll mill, calendered at 450° F. and subsequently molded into plaques using the method described in Example 1.

The data set forth in Table 11 is a comparison of the unmodified polysulfone resin with the polysulfone resin blended with the graft copolymer described in this example.

TABLE 11.—COMPARISON OF RESIN AND POLYBLEND PROPERTIES

|  | 100% polysulfone | 90% polysulfone, 10% S/MMA on EPDM [1] |
|---|---|---|
| ¼″ notch Izod impact strength (ft.-lbs./in.) +73° F. | 0.8 | 11.1 |
| Percent increase in impact strength over base resin |  | 1,287 |
| Flexural modulus | 373,000 | 302,000 |
| Percent decrease of flexural modulus over base resin |  | 19 |
| Heat distortion temp. (° F., 264 p.s.i.) | 341 | 334 |
| Rockwell hardness |  | 115 |

[1] The graft copolymer of styrene-methylmethacrylate on ethylene-propylene terpolymer spine described above.

EXAMPLE 12

This example illustrates the degree of improvement in impact strength achieved by incorporating into polysulfone resin (coded P–1700 and sold by Union Carbide Co.) various levels of a graft copolymer consisting of 50% methyl methacrylate and 50% ethylene-propylene-5-ethylidene-2-norbornene terpolymer spine, said percentages being based on the total weight of graft co-polymer.

The terpolymer spine has a propylene content of 37%, based upon the total weight of the terpolymer and an iodine number 9.

The graft cooplymer used herein was prepared according to the method described in copending application Ser. No. 787,984, filed Dec. 30, 1968.

The graft copolymer was blended into the polysulfone resin at 480° F. on a differential roll mill, calendered at 450° F. and subsequently molded into plaques using the method described in Example 1.

The data set forth in Table 12 is a comparison of the unmodified polysulfone resin with the polysulfone resin blended with the graft copolymer described in this example.

TABLE 12.—COMPARISON OF RESIN AND POLYBLEND PROPERTIES

|  | 100% polysulfone | 90% polysulfone, 10% S/MMA on EPDM [1] |
|---|---|---|
| ¼″ notch Izod impact strength (ft.lbs./in.) +73° F. | 0.8 | 2.9 |
| Percent increase in impact strength over base resin |  | 262.5 |
| Flexural modulus | 373,000 | 316,000 |
| Percent decrease in flexural modulus over base resin |  | 15 |
| Heat distortion temp. (° F., 264 p.s.i.) | 341 | 332 |
| Rockwell hardness |  | 119 |

[1] The graft copolymer of methyl methacrylate on ethylene.propylene terpolymer spine described above.

EXAMPLE 13

This example illustrates the degree of impact improvement achieved by blending the graft copolymer of (28/12) styrene/acrylonitrile of an ethylene propylene-5-ethylidene-2-norbornene terpolymer spine as described in Example 8 with polysulfone at the 20% graft level. The graft polymer was blended into the polysulfone at 425° F. on a differential roll mill for 38 minutes and then calendered at 430° F.

This example also illustrates the unique character of the impact improvement achieved using a graft polymer since a similar improvement in impact strength is not obtained with a styrene/acrylonitrile resin preblended with an ethylene/propylene terpolymer.

This preblended was incorporated into polysulfone at the 20% level on a differential mill at 440° F. and subsequently calendered at 450° F.

TABLE 13.—COMPARISON OF RESIN AND POLYBLEND PROPERTIES

| | 100% polysulfone | 80% polysulfone, 20% S/AN on EPDM | 80% polysulfone, 12% EPDM, 8% S/AN |
|---|---|---|---|
| ¼" notch Izod impact strength (ft.-lbs./in.) +73° F | 0.8 | 5.38 | 1.7 |
| Heat distortion temp. (° F., 264 p.s.i.) | 341 | 324 | 324 |
| Rockwell hardness | | 95 | |

The mixtures of this invention may contain certain other additives to plasticize, extend, lubricate, prevent oxidation of the mixtures, and can also include flammability retarding agents, dyes, pigments, etc. Such additives are well known in the art and may be incorporated without departing from the scope of the invention.

The following ASTM tests were used to determine the data disclosed in the examples: notched izod impact (D–256–56 Method A); flexural strength and modulus (D–638–64T); heat distortion at 264 p.s.i. fiber stress (D–648–56); Rockwell hardness (D–785–65).

Having thus described our invention, what I claim and desire to protect by Letters Patent is:

1. A synthetic thermoplastic resin composition comprising a blend of
    (A) from about 75% to 99% based on total weight of composition of a linear thermoplastic polyarylene polyether polysulfone resin and is composed of recurring units having the formula:

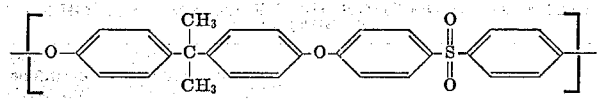

wherein R represents a member of the group consisting of a bond between aromatic carbon atoms and a divalent connecting radical and R' represents sulfone, Y and Y₁ each represent inert substituent groups selected from the group consisting of halogen, alkyl groups having from 1 to 4 carbon atoms and alkoxy groups having from 1 to 4 carbon atoms and where r and z are integers having a value from 0 to 4 inclusive, and (B) correspondingly from about 1% to 25% based on total weight of composition of
        (i) an ethylene-propylene-non - conjugated diene terpolymer, or
        (ii) an ethylene-propylene-non-conjugated diene terpolymer spine grafted with styrene, styrene-acrylonitrile, methyl methacrylate, or styrene-methyl methacrylate.

2. The composition as in claim 1 wherein (A) is composed of between about 80% and 95% by weight of recurring units of the formula:

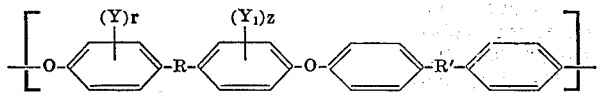

3. The composition of claim 2 in which (B) is ethylene-propylene-dicyclopentadiene terpolymer.
4. The composition of claim 2 in which (B) is an ethylene-propylene-1,4-hexadiene terpolymer.
5. The composition of claim 2 in which (B) is an ethylene-propylene-5-ethylidene-2-norbornene terpolymer.
6. The composition of claim 2 in which (B) is a graft polymer of styrene-acrylonitrile on an ethylene-propylene-5-ethylidene-2-norbornene spine.
7. The composition of claim 2 in which (B) is a graft polymer of styrene-methyl methacrylate on an ethylene-propylene-5-ethylidene-2-norbornene spine.
8. The composition of claim 2 in which (B) is a graft polymer of methyl methacrylate on an ethylene-propylene-5-ethylidene-2-norbornene spine.
9. The composition of claim 2 in which (B) is ethylene-propylene-1,4-cyclooctadiene.
10. The composition of claim 2 in which (B) is a graft polymer of styrene on an ethylene-propylene-5-ethylidene-2-norbornene spine.

References Cited

UNITED STATES PATENTS

| 3,510,415 | 5/1970 | Barth | 260—49 X |
| 3,489,821 | 1/1970 | Witt et al. | 260—876 |
| 3,472,810 | 10/1969 | Gowan | 260—897 X |
| 3,405,199 | 10/1968 | Snedeker | 260—897 X |
| 3,400,065 | 9/1968 | Barth | 204—159.2 |

MURRAY TILLMAN, Primary Examiner

H. W. ROBERTS, Assistant Examiner

U.S. Cl. X.R.

260—49, 897 R